(12) United States Patent
Shaw

(10) Patent No.: US 8,740,618 B2
(45) Date of Patent: Jun. 3, 2014

(54) BRAILLE MODULE WITH COMPRESSIBLE PIN ARRAYS

(76) Inventor: Keith N. Shaw, Gloucester, MA (US)

( * ) Notice: Subject to any disclaimer, the term of this patent is extended or adjusted under 35 U.S.C. 154(b) by 1892 days.

(21) Appl. No.: 11/880,360

(22) Filed: Jul. 20, 2007

(65) Prior Publication Data

US 2009/0023116 A1 Jan. 22, 2009

(51) Int. Cl.
G09B 21/00 (2006.01)
(52) U.S. Cl.
CPC ........... *G09B 21/004* (2013.01); *G09B 21/003* (2013.01)
USPC ........... 434/113; 434/112; 434/114; 434/115; 116/17; 116/205; 340/407.1; 340/407.2; 348/62
(58) Field of Classification Search
CPC .......................... G09B 21/003; G09B 21/004
USPC ................... 434/112, 113, 114; 116/17, 205; 340/407.1, 407.2; 348/62
See application file for complete search history.

(56) References Cited

U.S. PATENT DOCUMENTS

| | | | | |
|---|---|---|---|---|
| 3,659,354 | A * | 5/1972 | Sutherland | 434/113 |
| 3,987,438 | A * | 10/1976 | Lindenmueller et al. | 340/407.1 |
| 4,178,586 | A * | 12/1979 | Schonherr | 340/407.1 |
| 4,191,945 | A | 3/1980 | Hannen et al. | |
| 4,283,178 | A | 8/1981 | Tetzlaff | 434/114 |
| 4,445,871 | A * | 5/1984 | Becker | 434/114 |
| 4,600,320 | A * | 7/1986 | Hoovler et al. | 400/109.1 |
| 4,871,992 | A * | 10/1989 | Petersen | 340/407.1 |
| 4,898,536 | A * | 2/1990 | Hoffarth | 434/114 |
| 5,449,292 | A | 9/1995 | Tani et al. | |
| 5,580,251 | A | 12/1996 | Gilkes et al. | |
| 5,685,721 | A | 11/1997 | Decker | |
| 5,717,423 | A * | 2/1998 | Parker | 434/114 |
| 6,109,922 | A * | 8/2000 | Litschel et al. | 434/114 |
| 6,354,839 | B1 * | 3/2002 | Schmidt et al. | 434/113 |
| 6,417,821 | B1 * | 7/2002 | Becker et al. | 345/31 |
| 6,445,284 | B1 * | 9/2002 | Cruz-Hernandez et al. | 340/407.1 |
| 6,459,364 | B2 | 10/2002 | Gupta | |
| 6,692,255 | B2 * | 2/2004 | Roberts et al. | 434/113 |
| 6,693,516 | B1 * | 2/2004 | Hayward | 340/407.1 |
| 6,734,785 | B2 | 5/2004 | Petersen | |
| 6,743,021 | B2 | 6/2004 | Prince et al. | |
| 6,776,619 | B1 | 8/2004 | Roberts et al. | |
| 6,827,512 | B1 | 12/2004 | Souluer | |
| 6,902,403 | B1 | 6/2005 | Goldenberg | |
| 7,009,595 | B2 | 3/2006 | Roberts et al. | |
| 7,018,209 | B2 | 3/2006 | Schleppenbach et al. | |
| 7,367,806 | B1 * | 5/2008 | Murphy et al. | 434/112 |
| 7,462,034 | B1 * | 12/2008 | Murphy et al. | 434/112 |
| 7,723,896 | B2 * | 5/2010 | Esashi et al. | 310/306 |
| 2004/0110562 | A1 * | 6/2004 | Kajino et al. | 463/36 |
| 2008/0206722 | A1 * | 8/2008 | Fukami | 434/114 |
| 2008/0246737 | A1 * | 10/2008 | Benali-Khoudja et al. | 345/173 |

\* cited by examiner

*Primary Examiner* — Nikolai A Gishnock
(74) *Attorney, Agent, or Firm* — Patent Law & Venture Group; Gene Scott

(57) ABSTRACT

A refreshable tactile reader apparatus for Braille text and graphics, utilizing a plurality of compressible tactile pins that can absorb strong downward forces. Such strong forces transmitted through tactile pins can damage pin actuation mechanisms. The physical enclosure of the reader provides open channels that allow the apparatus to be more easily cleaned than prior art enablements.

8 Claims, 2 Drawing Sheets

BRAILLE MODULE WITH COMPRESSIBLE PIN ARRAYS

STATEMENT REGARDING FEDERALLY SPONSORED RESEARCH OR DEVELOPMENT

The present invention was developed, at least in part, under NSF SBIR Phase I proposal #0539464, funded on Jan. 3, 2006.

CROSS-REFERENCE TO RELATED APPLICATIONS

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

REFERENCE TO A "MICROFICHE APPENDIX"

Not applicable.

BACKGROUND OF THE INVENTION

1. Field of the Present Disclosure

This disclosure relates generally to refreshable tactile displays for Braille text and graphics for the blind, and, more particularly, relates to an easily cleaned Braille module utilizing tactile pins that can absorb strong downward forces without damage to the pins or the actuation mechanism.

2. Description of Related Art Including Information Disclosed Under 37 CFR 1.97 and 1.98

Hannen et al., U.S. Pat. No. 4,191,945 discloses an electromechanical apparatus for setting up and erasing alphanumeric characters or other symbols in Braille by means of a tactile display. Dot pins simulating Braille are supported for movement within holes in a display plate to a position protruding therefrom to form tactile characters and for retraction to a withdrawn position flush with the surface of the display plate. Solenoid-operated plungers are arranged to selectively project the dot pins. Latch elements are movable by energizing the solenoid to a position to support the plungers in their operative position, a common support for the latch elements movable in a plane perpendicular to the axis of the support plungers to remove the latch elements, and spring means for restoring the support plate to its initial position.

Tetzlaff, U.S. Pat. No. 4,283,178 An electromechanical braille cell is disclosed wherein each cell includes six braille indicia formed by the free ends of a vertical stack of cantilever supported piezoelectric reeds. Applying an operating potential to a respective reed causes the reed to bend about a fulcrum at the supported root end of the reed causing the free end to deflect in such a manner as to cause the indicia rod to protrude through an opening in the reading surface of the braille cell. Simultaneous energization of one or more of the reeds in the respective stack defines a given braille character sensed by the operator. The free ends of the reeds are tiered in pairs in a stair step configuration so that the sensing rods from a lower pair of reeds pass by the free end portions of the reeds of a higher step. The upper reed of each pair of reeds is notched to allow passage of the sensing rod associated with the lower reed of that pair of reeds.

Petersen, U.S. Pat. No. 4,871,992 discloses a tactile display according to which a touch pin is selectively movable relative to a reference surface. An electromagnet distant from the reference surface has spaced poles of opposite, selectively reversible, polarity. A cam rotatable about an axis transverse to the reference surface has an integral permanent magnet with similarly spaced poles of opposite polarity equidistant from the axis of rotation. The cam is rotatable between an active position at which its respective poles are attached to and positioned adjacent the poles of the electromagnet and an inactive position at which the reversed poles of the permanent magnet are attracted to and positioned adjacent the opposite poles of the electromagnet. A touch pin has a longitudinal axis transverse to the reference surface and includes a follower end engagable with the cam and a tip end distant from the follower end. The pin is movable on the cam between a first position raised above the reference surface when the cam is in the active position and a second position not projecting beyond the reference surface then the cam is in the inactive position. A plurality of touch pins and associated mechanisms can be combined into a matrix to form a tactile display unit and a plurality of such units can be provided in a console and electronically driven in an intelligent fashion to provide the user with various forms of tactile information.

Tani et al., U.S. Pat. No. 5,449,292 discloses a tactile reading device including sensing rods that are supported to be vertically movable, piezo-electric actuating elements disposed in the vertical direction such that their free end portions are directed upward, and pushing-up cams having first levers which are axially and pivotally supported on support rods provided at an upper position of the free end portions of the piezo-electric actuating elements, extending downward from the support rods, and having side surfaces at distal end portions thereof which are freely abutted against the free end portions of the piezo-electric actuating elements, and second levers extending horizontally from the support rods and freely mounting, on their mounting planes, lower end portions of the sensing rods corresponding to the piezo-electric actuating elements.

Gilkes et al., U.S. Pat. No. 5,580,251 discloses a Braille display device which comprises: a plurality of cavities; and circuitry to individually excite the plurality of cavities. The plurality of cavities contain a positive and a negative electrode and are filled with a quantity of polar organic gel sensitive to electric fields. The cavities are sealed by an elastomeric film. The elastomeric film is held generally flat, by its own tension, in the absence of any voltage applied to the electrodes in the plurality of cavities. The display device can also include circuitry to determine whether the cavity has been touched by a person who is reading the display. The display device can also include circuitry to individually vibrate each cavity. Other devices, systems and methods are also disclosed.

Decker, U.S. Pat. No. 5,685,721 discloses a refreshable Braille cell display using a single moving part per tactile element. Tactile elements, formed from stainless steel tubing, are assembled in densely arranged modules. Lower ends of the tactile elements extend beneath the modules and are in contact with a pressurized medium. Shape memory alloy actuators are positioned in the tactile elements, isolated from any motion or flow in the pressurized medium. When a pressurized medium is delivered through a port in a tactile element, the actuator extends upward, thereby forcing the upper portion of the tactile element through a hole in the user contact surface. In that state the tactile element indicates information. When the tactile element is activated, current flows from an electrical contact at the lower end of the tactile element, through the actuator, and into the outer tube of the tactile element. The actuator heats, due to electrical resistance, contracts and exerts a downward force on the pressure medium. The upper portion of the tactile element is drawn below the user contact surface, indicating the absence of information. Distributed pulse width modulation allows instantaneous power requirements to be minimized, and only low safe voltages are needed to operate the array. By applying a bias force to all actuators via a common reservoir of either pneumatic or hydraulic pressure, the design is simplified, and reliability is increased. When integrated with a computer, the refreshable tactile array of elements gives users access to full computer generated screens of text and graphical information in real time.

Becker et al., U.S. Pat. No. 6,417,821 discloses a tactual computer monitor including rows and columns of rectangular cells. Each cell includes four rows and two columns of movable pins which are felt and read by a blind person. The pins are driven by electromechanical impact drivers and are held in position by resilient elastomeric cords. The impact drivers are carried on a bi-directional print head which travels beneath the movable pins. An erasing mechanism is provided to positively drive the pins downwardly to erase the characters produced by the print head.

Gupta, U.S. Pat. No. 6,459,364 discloses a method of communicating electronic information via a display device having a matrix of movable tactile elements. The method includes displaying a representation of a file containing hypertext links on a first portion of the matrix, and displaying a list of the hypertext links on a second portion of the matrix. The representation may include graphical elements and text symbols such as Braille.

Petersen, U.S. Pat. No. 6734,785 discloses a tactile display system that includes a housing containing a tactile pin movable axially transverse of a reference surface and an actuator mechanism engagable therewith for selective movement between raised and lowered positions. An elongated electromagnet distant from the reference surface is aligned with the tactile pin and has spaced poles of opposite, selectively reversible, polarity. A generally spherical rotatable positioning member being a permanent magnet having a peripheral surface which is partially a spherical surface and partially a truncated surface has an axis of rotation coaxial with the tactile pin and the electromagnet and is responsive to operation of the electromagnet, being movable between a first position at which the spherical surface faces the tactile pin, causing positioning of the tactile pin at the raised position and a second position at which the truncated surface faces the tactile pin causing positioning of the tactile pin at the lowered position.

Prince et al., U.S. Pat. No. 6,743,021 discloses a refreshable display system with a flexible surface, with one application being a refreshable Braille display systems for use as a monitor for computer systems.

Roberts et al., U.S. Pat. No. 6,776,619 discloses an apparatus and method for refreshable tactile display, the apparatus being preferably embodied as a rotating-wheel refreshable Braille reader. The reader includes a housing having a reading aperture with a rotatable wheel assembly maintained therein so that a display surface of a rotating wheel passes the reading aperture. The wheel has endless rows of openings defined therethrough to the display surface, a pin held in each opening and freely movable therein. Actuators, at least equal in number to the rows of openings but substantially fewer in number than the openings, are held at a static location relative to the wheel for selectively moving pins in the rows so that Braille characters are arrayed at the display surface after passing the static location. Braille characters are thus streamed across the reading aperture of the housing.

Souluer, U.S. Pat. No. 6,827,512 discloses a refreshable display unit with a housing, a plurality of refreshable cells housed in the housing, the cells having a guide block with at least six holes, six motors each with a coupler which may be rotated by the motor, a pin fastened to each coupler and extending into engagement with one of the holes of the guide block, and a stop mounted on each coupler for engaging stop elements mounted on the housing for limiting the rotation of the coupler, the placement of the stop elements on the housing being such that it controls the height extension of the pin fastened to the coupler with respect to the guide block, the unit further having a connector for connecting the display unit to the electronic means of a computer. A unit may have a plurality of keys for inputting a character, including at least two sets of keys, a first set being used when the keyboard is oriented in a first direction and a second set being used when the keyboard is oriented in a second direction.

Goldenberg, U.S. Pat. No. 6,902,403 discloses a Braille pin that has three parts sharing a common longitudinal axis. A first part has a first breadth and includes a rounded tip felt by a user. A second part has a noncircular transverse cross-section and has a breadth greater than the first breadth. A first shoulder is formed by the juncture of the first and second parts. A third part has a third breadth less than the second breadth. A second shoulder is formed at the juncture of the second and third parts. A pinhole has first, second, and third sections that respectively receive the first, second and third parts of the pin. The first shoulder limits upward pin travel by abutting an overhang at the juncture of the first and second pinhole sections. The second shoulder limits downward pin travel by abutting a step at the juncture of the second and third pinhole sections.

Roberts et al., U.S. Pat. No. 7,009,595 discloses an apparatus and methods for an extended refreshable tactile graphic display, the apparatus including an array of pins at a display surface, with pin setting actuators and a display surface matrix preferably being separable units. The display matrix is provided by stacked functional layers having functions including temporary pin retention and pin locking.

Schleppenbach et al., U.S. Pat. No. 7,018,209 discloses various apparatus and methods for an actuator and display using one or more shape memory springs. A shape memory spring is heated and urges a pin to a first or extended position. The pin may be supported in the first position by a supporting mechanism. The shape memory spring is heated electrically, and in some embodiments under the control of a processor. The present invention may be used to display information provided in a user interface from a computer program, including text, numerical data, and graphical images.

The related art described above discloses refreshable tactile displays which can produce Braille text and graphics using tactile pins controlled by various types of actuator devices. However, the prior art fails to disclose a refreshable tactile display that uses compressible tactile pins and a module structure that is easily cleaned. The present disclosure distinguishes over the prior art providing these and other currently unknown advantages as described in the following summary.

BRIEF SUMMARY OF THE INVENTION

This disclosure teaches certain benefits in construction and use which give rise to the objectives described below.

Braille reading devices provide a refreshable tactile display. Such a display includes a large number of tactile pins arranged in a regular pattern relative to a reference surface. The reference surface is normally horizontal and the pins are mounted vertically. The tactile pins are selectively moved between a "down" or retracted position, and an "up" or extended position. In the retracted position, the pins do not protrude above the reference surface, whereas in the extended position the pins protrude above the reference surface in accordance with an industry standard height. Use of a refreshable tactile display for Braille text and graphics for the blind is a common practice.

Typically these displays involve the use of an array of tactile pins set in appropriate combinations of extended and retracted states by way of an actuating mechanism to produce the desired Braille text and graphics. However, because of the relatively small dimensions of the operational components comprising a tactile display, the mechanism required to move the pins between states is not robust. Therefore, this mechanism must be protected from damage by forces delivered to the tactile pins from above. Such a force may be, for instance, due to a heavy object inadvertently placed on top of the tactile display while it is in use. Regardless, the pins must reliably change state while in contact with a user's finger or other part of the hand.

Additionally, as the user's fingers are in contact with the heads of the tactile pins, and the pins are moving up and down during refresh cycles, it is inevitable that small pieces of debris will find their way into the chambers housing the tactile pins. Over time this debris may build up to the point that one or more of the pins is no longer able to move reliably between its extended and retracted states. This in turn leads to "bad Braille" with the only recourse currently available being to return the device to the manufacturer for service, which comes at a significant cost and leaves the user without his or her reader for an extended period.

The presently described apparatus provides a solution to these difficulties. The Braille pins utilized in the present invention are compressible; not by the normal forces of the user's fingers during use of the apparatus, but by greater forces that inadvertently may be directed to the pins when they are extended. Such forces, able to compress the pins, are not so great as to damage pin actuation mechanisms. Such a Braille display or reader may also provide open channels that allow for easy cleaning of the Braille pin apertures and the chambers that connect them.

A primary objective inherent in the above described apparatus and method of use is to provide advantages not taught by the prior art.

Another objective is to provide a Braille reader apparatus with pins that are compressible, thus enabling the pins to absorb opposing force while maintaining an "up" or extended state without transferring that potentially damaging force to the actuating device.

A further objective is to provide a Braille reader apparatus with a plurality of open channels to allow for easy cleaning of debris buildup within the pin chambers and apertures.

An even further objective is to provide a Braille reader apparatus with the ability to produce multiple lines of text and graphics at one time.

Other features and advantages of the present invention will become apparent from the following more detailed description, taken in conjunction with the accompanying drawings, which illustrate, by way of example, the principles of the presently described apparatus and method of its use.

BRIEF DESCRIPTION OF THE SEVERAL VIEWS OF THE DRAWING(S)

Illustrated in the accompanying drawing(s) is at least one of the best mode embodiments of the present invention. In such drawing(s):

DETAILED DESCRIPTION OF THE INVENTION

The above described drawing figures illustrate the described apparatus and its method of use in at least one of its preferred, best mode embodiment, which is further defined in detail in the following description. Those having ordinary skill in the art may be able to make alterations and modifications to what is described herein without departing from its spirit and scope. Therefore, it must be understood that what is illustrated is set forth only for the purposes of example and that it should not be taken as a limitation in the scope of the present apparatus and method of use.

Figure 1:
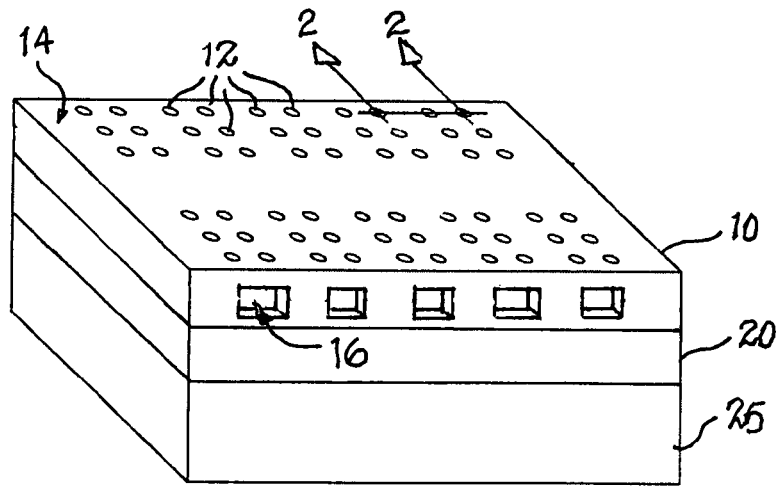
FIG. 1 is a perspective view of the presently described apparatus.

Described now in detail, and illustrated in a generic manner in FIG. 1, is a refreshable tactile reader apparatus for Braille text and graphics. The apparatus utilizes a plurality of compressible Braille pins as shown in exemplary FIG. 2. The apparatus has an upper deck 10 providing a plurality of first apertures 12 therethrough, and a lower deck 20 providing a plurality of second apertures 22 therethrough. The decks 10 and 20 are rectangular plates with hollowed-out portions. The apertures 12 and 22 are arranged in corresponding coaxial pairs on vertical axes. A plurality of Braille pins 30 are each axially engaged with one pair of the apertures 12, 22 for translation therein. Each pin 30 is positionable into an upwardly extended state, as demonstrated by the center pin 30 in FIG. 2, so that an upper portion 31 of the pin 30 partially protrudes above a reference surface 14 of the upper deck 10. Each pin 30 is alternately positionable into a downwardly retracted state, as demonstrated by the left pin 30 in FIG. 2, wherein the upper portion 31 of the pin 30 is concealed below the reference surface 14. A compressible element 40 joins the upper 31 and lower 32 portions of each of the pins 30.

Figure 2:
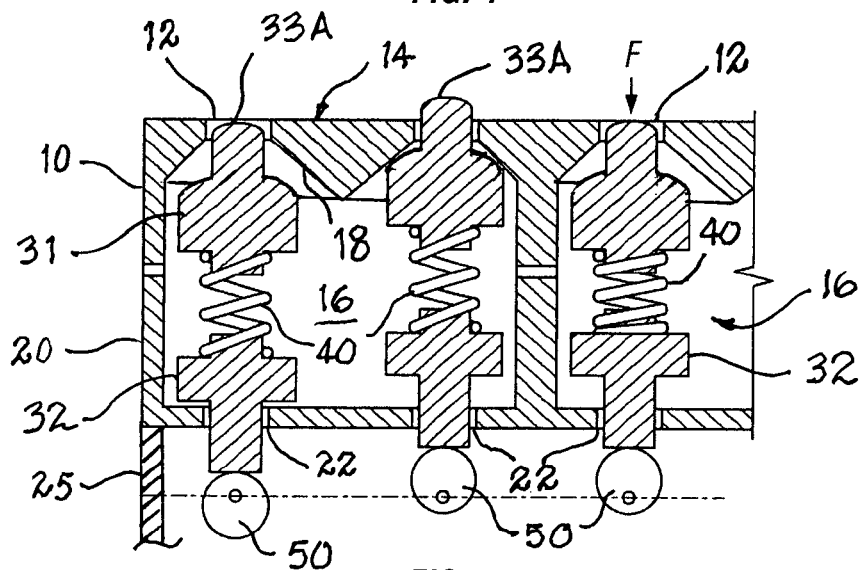
FIG. 2 is a cross-sectional view thereof taken from section line 2-2 in FIG. 1.

The upper deck 10 and lower deck 20 are formed from molded plastic or other structural materials and are preferably impermanently joined together by standard hardware. A plurality of chambers 16 (the hollowed-out portions) are established between the decks 10 and 20 as shown in FIG. 2. Each chamber 16 is capable of housing a plurality of the pairs of the tactile pins 30, the number of pins 30 being equal to the number of sets of apertures 12, 22 in the upper 10 and lower 20 decks. The pins 30 are spaced apart and positioned in accordance with Braille pin spacing standards; thereby enabling the production of Braille text and graphical patterns. The apertures 12, 22 have diameters of such size as to allow free translation of pins 30 between the extended and retracted states. A typical embodiment of the present invention would incorporate sixty pins 30 in ten columns and six rows, as required for a multi-line display of 2×5 6-dot Braille characters. However, the present invention can provide for any number and arrangement of Braille pins 30 to suit a desired purpose.

As shown in FIG. 1, the terminal ends of each of the chambers 16 are exposed, creating an open channel between the front and rear of the apparatus. The chambers 16 allow for easy cleaning, e.g., flushing with a solvent such as water.

Figure 3:
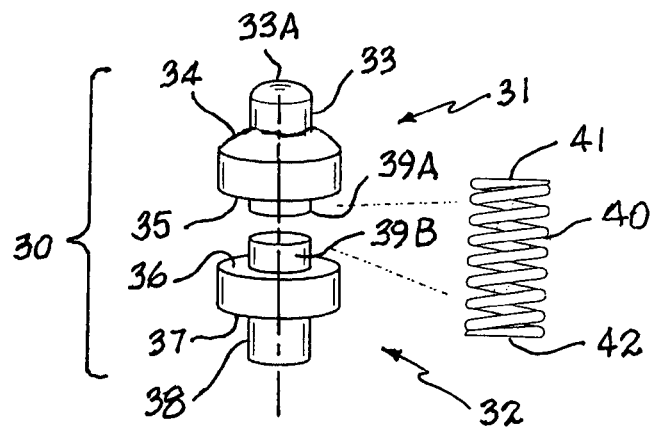
FIG. 3 is an exploded view of a single Braille tactile pin of the apparatus.

As shown in FIG. 3, both the upper pin portion 31 and the lower pin portion 32 of each pin 30 is preferably a molded plastic part of solid cylindrical form. Of course, metal and other structural materials may be substituted for plastic in this application. The upper pin portion 31 is formed with a circular central flange comprising a top shoulder 34 and an upper medial shoulder 35, while the lower pin portion 32 also is formed with the central flange comprising a lower medial shoulder 36 and a bottom shoulder 37. An upper body 33 extends upwardly from the top shoulder 34 and terminates with a hemispherical cap 33A while an upper medial body 39A extends downwardly from the upper medial shoulder 35, and both body 33 and body 39A are aligned coaxially. Likewise, a lower medial body 39B extends upwardly from the lower medial shoulder 36 while a lower body 38 extends downwardly from the bottom shoulder 37 and both body 39B and body 38 are aligned coaxially. The shoulders 34, 35, 36, and 37, form the central flanges as stated, and both have a diameter greater than that of the upper body 33, upper medial body 39A, lower medial body 39B and lower body 38. Preferably, the top shoulder 34 is rounded as shown in FIG. 3. Having a rounded top shoulder 34 provides an improved contact between upper pin portion 31 and the interior surface 18 of upper deck 10 which limits upward translation of the pin 30. In addition, this feature facilitates self-alignment of the pins 30.

The compressible element 40 joins the upper 31 and lower 32 portions of pin 30. Element 40 is preferably a conventional compression coil spring, as shown in FIG. 3, but may also be, for instance, an elastomeric material with a form factor matching, positioned between, and joining the upper and lower portions 31 and 32. Element 40 preferably has squared and ground terminal ends 41 and 42 and is press fit onto the upper medial body 39A and the lower medial body 39B as shown in FIG. 2 with the ground ends 41 and 42 in contact with the upper medial shoulder 35 and lower medial shoulder 36 respectively, thereby forming an inseparable assembly of the three parts 31, 32, and 40.

As shown in FIG. 2, each one of the Braille pins 30 can be positioned in one of two mutually exclusive states: extended or retracted. Translation between these two states is accomplished using an actuator device such as cog-wheel 50 shown in FIG. 2, for instance, or linear actuator 52, shown in FIG. 4. The actuator devices are located directly below the lower deck 20 within housing 25 and move pins 30 by applying forces to lower body 38 of the pin 30. The linear actuator 52 may be engaged with lower body 38 in order to force pin 30 upward and also downward, or if not engaged, pin 30 may move downward under the force of gravity when linear actuator 52 retracts, as shown at the left in FIG. 4.

The functionality of the present invention is independent of the actuator devices used; thus, a variety of different actuator devices, as, for instance, shown and described in the above prior art, can be integrated with the present invention and achieve comparable results.

Due to the relatively small dimensions of the operational components comprising a tactile display, commonly used actuator devices may not be robust. Therefore, the actuator devices must be protected from damage by relatively large forces transmitted through the tactile pins 30, as demonstrated by the right pin in FIG. 2. Such a force may be, for instance, due to a heavy object placed on the reference surface 14 of the upper deck 10 while some pins 30 are in the extended state. To avoid such damage, the compressible element 40 of each one of the Braille pins 30 allows the pins 30 to compress when force "F" (FIG. 2) is greater then typical forces applied during tactile reading. Once force "F" is removed, the compressible element 40 returns to its nominal extension.

Figure 4:
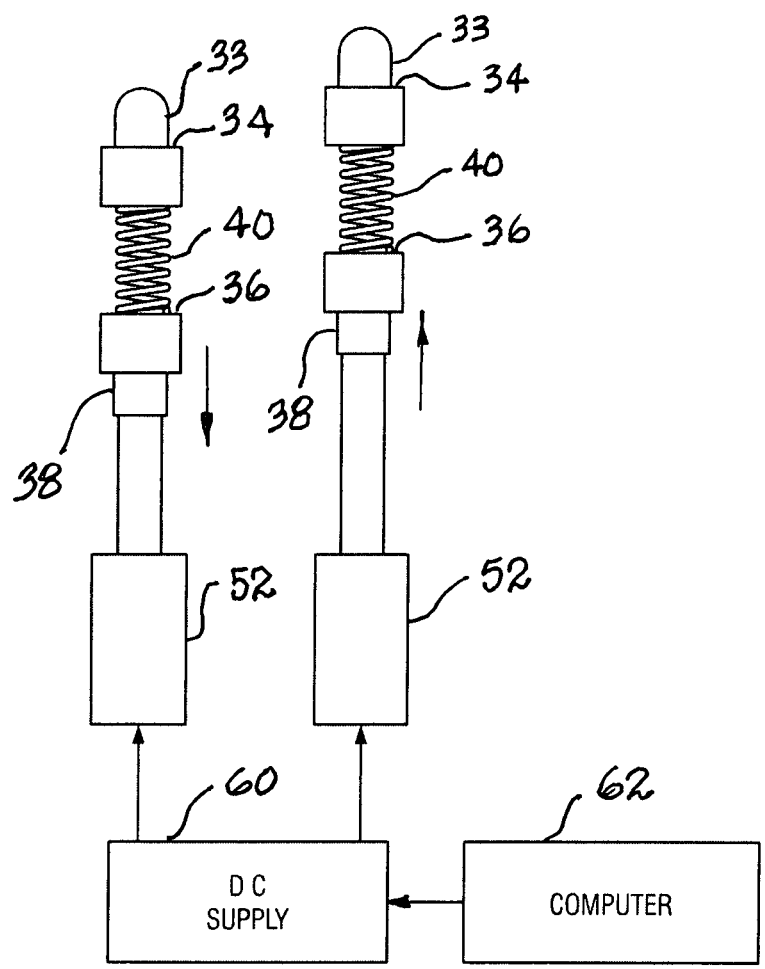
FIG. 4 is a schematic diagram illustrating a preferred actuation scheme of the invention.

As shown in FIG. 4, the actuators 52 may be operated by a DC power supply 60 which is controlled by a microprocessor or computer 62 in accordance with a program for presenting upwardly extended pins 30 for tactile reading.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A Braille reader apparatus comprising:
    an upper and a lower spaced apart deck having a plurality of axially aligned aperture pairs and a reference surface of the upper of the spaced apart decks;
    a plurality of Braille pins, each one of the Braille pins axially aligned with one of the aperture pairs and in mutual engagement therewith;
    each one of the Braille pins having a compressible element joined in mutual axial alignment with and positioned between an upper pin portion, and a lower pin portion, wherein the pin portions are spaced apart and non-contacting, the pin portions separately movable in independent linear motion controlled by the compressible elements and the aperture pairs;
    wherein, the upper pin portions extend above the reference surface when the lower pin portions are moved in a first direction, and the upper pin portions are retracted below the reference surface when the lower pin portions are moved in a second direction; and wherein, the upper pin portions are retracted below the reference surface when the lower pin portions are moved in the first direction by compression of the compressible elements.

2. The apparatus of claim 1 wherein the decks define therebetween a plurality of chambers between a front and a rear of the apparatus with terminal ends of each of the chambers exposed thereby creating an open channel whereby a flushing fluid may be directed through the chambers in a direction orthogonal to the first and second directions of movement of the Braille pins.

3. The apparatus of claim 1 wherein the Braille pins are spaced apart and positioned to produce Braille text and graphical patterns.

4. The apparatus of claim 1 wherein the upper pin portion of each of the Braille pins has an upper body and a top shoulder positionable in contact with the upper deck whereupon the upper body is above the reference surface thereby determining a sensible position of the Braille pins.

5. The apparatus of claim 4 wherein the lower pin portion has a lower body and a bottom shoulder positionable in contact with the lower spaced apart deck when the upper body is below the reference surface thereby determining a non-sensible position of the Braille pin.

6. The apparatus of claim 1 wherein the compressible element are a coil spring having squared and ground opposing ends, the upper and lower pin portions fitted into opposing ends of the coil spring.

7. The apparatus of claim 5 wherein the lower body of each of the Braille pins is in sliding contact with a linear actuator, the linear actuator positioned and enabled for moving the Braille pins axially in cyclical motion.

8. The apparatus of claim 1 wherein the aperture pairs in the upper deck are convergent toward the reference surface and a top shoulder of each of the upper portions of the pins are rounded, whereby, the pins are centered within the aperture pairs in the upper deck when the top shoulders contact the aperture pairs.

* * * * *